Figure 1:
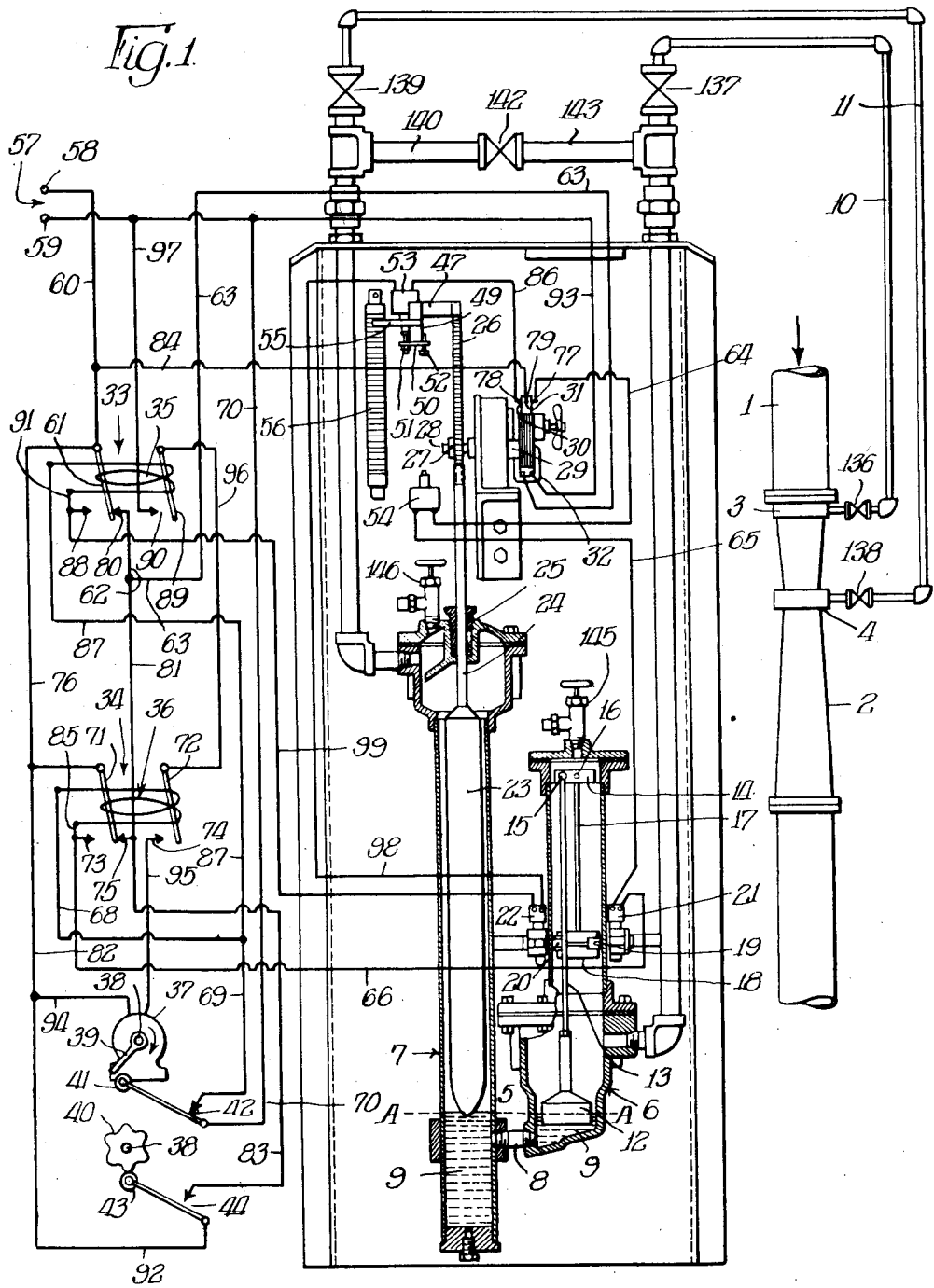

Nov. 21, 1944.　　W. H. GREEN ET AL　　2,363,174
ACTUATOR CONTROL
Filed Nov. 4, 1942　　2 Sheets-Sheet 1

INVENTORS:
Walter H. Green,
Samuel L. Adelson,
BY

Nov. 21, 1944.        W. H. GREEN ET AL        2,363,174
ACTUATOR CONTROL
Filed Nov. 4, 1942        2 Sheets-Sheet 2
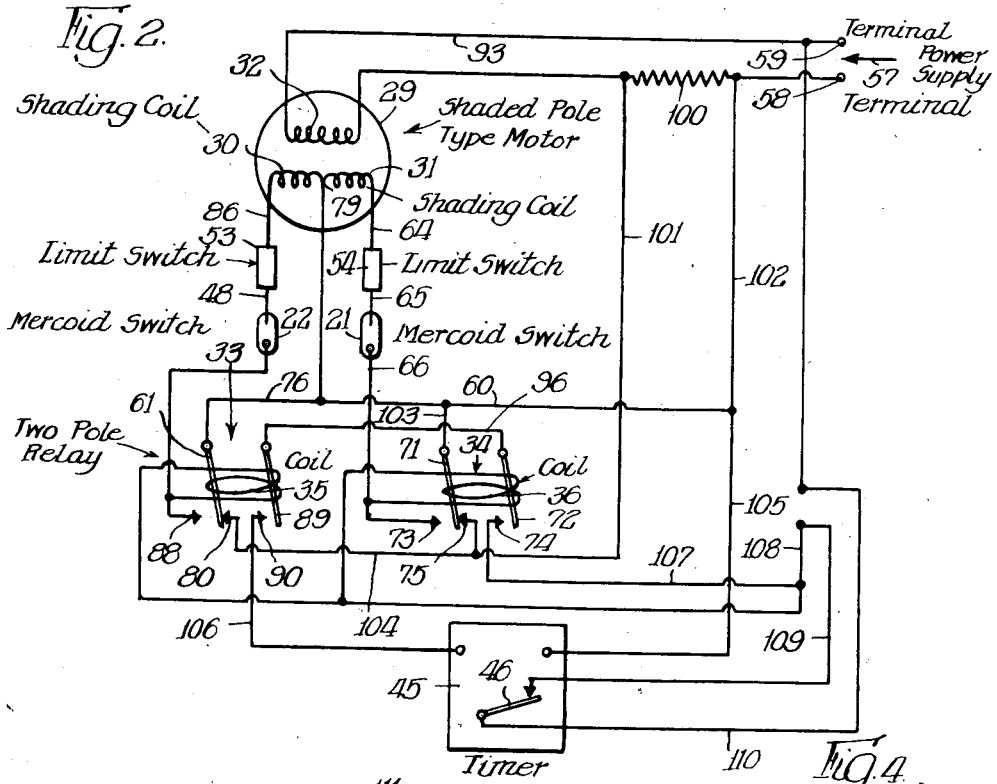
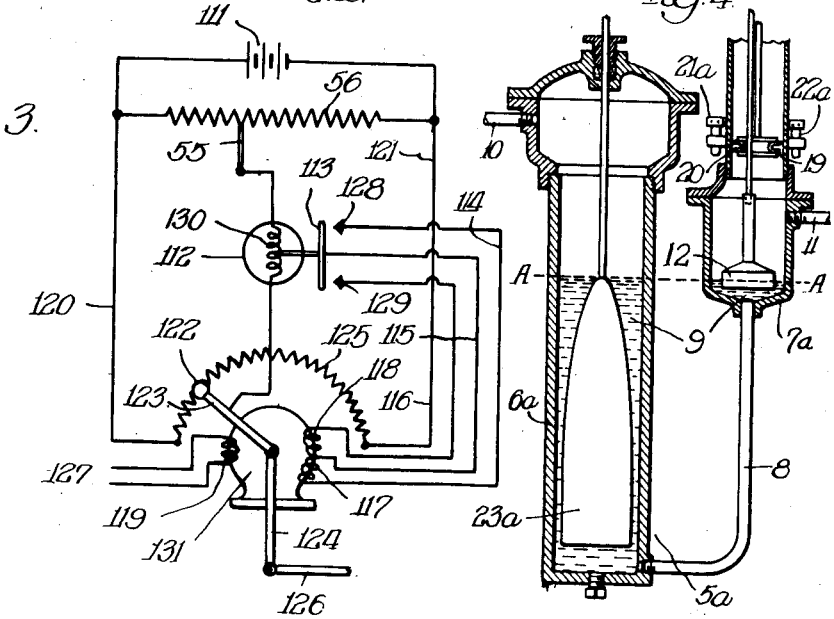
INVENTORS:
Walter H. Green,
Samuel L. Adelson,
BY Patented Nov. 21, 1944

2,363,174

UNITED STATES PATENT OFFICE 2,363,174

ACTUATOR CONTROL

Walter H. Green, Batavia, and Samuel L. Adelson, Chicago, Ill., assignors to Infilco Incorporated, Chicago, Ill., a corporation of Delaware Application November 4, 1942, Serial No. 464,550

11 Claims. (Cl. 172—239)

This invention relates to an improved actuator or device responsive to a pressure differential such as is created by the flow of a liquid through a Venturi tube or orifice located in a conduit, the height of a column of liquid or other pressure difference. The invention further relates to actuating devices useful to follow and to indicate or record the rate of flow through a conduit or to integrate such flow, or to actuate a mechanism to control a flow, or whereby chemical may be fed into a system in proportion to the rate of flow through said system or to maintain a constant head in a system. The invention further relates to actuating devices which find application in water and sewage treating plants, in industrial plants where process water, boiler feed water or waste water must be treated, and other similar uses where flows are to be governed or related.

As is well known to those familiar with the art, the pressure differential between the inlet and throat sections of a Venturi tube or orifice varies as the square of the rate of flow of fluid therethrough. Since the rate at which chemical must be fed must vary directly as the flow, it is evident that means must be provided for converting this square function into a linear function. In some of the prior art devices, this result is accomplished by means of cams and associated linkages and these are troublesome because of friction and of wear of moving parts and resulting inaccuracy. In other devices special metal electrical contactors engage columns of mercury. In spite of oil seals between the fluid in the conduit and the mercury, these contactors are troublesome because of electrolysis or deposits formed on the contactors in contact with the mercury and on the surface of the mercury.

A principal object of the invention is to provide a device of the kind referred to, operating on the manometer principle, of increased accuracy and sensitivity.

A general object is to provide a device of the kind that is from one aspect a test device that may be in internal equilibrium over a wide range of external pressure conditions to which it is subject but that is sensitive to change in such external conditions of small degree and that when the internal equilibrium is upset by external change acts to restore internal equilibrium in a manner that may be utilized to provide a variety of external responses and changes.

Another object is to provide in a device of this kind for a compensating movement to restore to equilibrium or neutral manometric fluid level and in which this movement may be in any desired predetermined relation or proportion to the change that had upset equilibrium or caused change of level.

Another object is to provide an improved device of this kind wherein the variation of level of the manometric fluid required to balance a pressure difference is in one leg only of the U-tubes whereby an improved form of U-tube may be employed.

An object closely associated with the preceding object is that of providing such a device having an actuating float resting on the fluid in one leg of the U-tube, which float normally occupies a predetermined zero position corresponding to a fixed manometric fluid level therein, and which float upon unusual change of fluid level in either direction sets in operation a corrective means that tends to restore the zero position level, and which at the same time and as a means toward such restoration, causes a movement proportional to the cause of the float displacement.

Another object is to multiply the effect of the float movement whereby the sensitivity and accuracy of the device is increased.

Another object is to provide novel and sensitive means of transmitting the effect of the movement of the float to the outside of the U-tube without the use of a stuffing box.

Another object is to provide such a device wherein the change of level of the manometric fluid in the float chamber is used only to initiate correction and other desired measures which are accomplished wholly by outside power so that the sensitivity of the instrument is unaffected by the amount of work to be done.

Another object is to reduce the volume of manometric fluid required and so the energy required to move it to initiate operation, while at the same time permitting the use of a large size float, thus promoting sensitivity and accuracy; also to improve actuator devices in other respects hereinafter specified and claimed.

Reference is to be had to the accompanying drawings forming a part of this specification, in which Figure 1 is a front elevation of the actuator apparatus with parts in section, Figure 2 is a wiring diagram of apparatus serving to prevent hunting of the actuator device, Figure 3 is a wiring diagram of a galvanometer control operating in conjunction with the actuator to vary the speed of a chemical feeding device, and Figure 4 is a central sectional elevation through a modified form of apparatus.

In order to set forth the principles employed and the manner of operation, there is hereinafter described one particular form the device may take and one set of indicators and controls that may be affected thereby, but these are intended to be illustrative and in the nature of examples and not to be taken as setting limitations. Thus obviously instead of the float being in the high pressure leg it could be on the low pressure side.

In the present invention, the square function of the pressure differential is converted into the linear function of the rate of flow of the liquid through the conduit by means of a float riding on the surface of a manometer fluid in one leg of a manometer, in which the level of the manometric fluid in this leg remains substantially constant regardless of the flow rate through the Venturi tube after equilibrium has been established. Because of this float feature, simple means associated with the float may be and are employed to position a control member whose movement from a datum will vary directly as the rate of flow through a conduit. It is the movement of this control member which is employed to actuate the meters or chemical feeders previously mentioned, and the force which this control member can exert is limited only by the power of the motor used as part of this invention.

Referring to the drawings by numerals, the fluid to be supplied with chemical flows through a conduit 1 (Figure 1), and a Venturi tube 2 is mounted in the conduit 1, said Venturi tube having an inlet section 3 and a throat section 4. A manometer 5 comprises a high pressure chamber 6 and a low pressure chamber 7, connected by a passage 8. Within the manometer 5 is a manometric fluid 9, such as mercury.

The inlet section 3 of Venturi tube 2 connects to high pressure chamber 6 of manometer 5 by means of valve 136, pipe 10, and valve 137, while the throat section 4 of Venturi tube 2 connects to the low pressure chamber 7 of manometer 5 by means of valve 138, pipe 11, and valve 139. A bypass line comprising pipes 140 and 143, and valve 142 is used to equalize the pressures in chambers 6 and 7 of manometer 5, when desired. Valves 136 and 138 at Venturi tube 2 may be used to remove the pressures from and at the Venturi tube 2 and from the manometer 5. For convenience valves 137 and 139 are employed so that the pressures from Venturi tube 2 may be removed from the manometer 5 at said manometer. An air relief valve 145 is provided for the high pressure chamber 6, and an air relief valve 146 is provided for the low pressure chamber 7.

Within the high pressure chamber 6, a float 12 rests on the surface of the mercury. A rod 13 of suitable material and adjustable as to length is fixed at one end to the float 12, the other end being pivotally attached to a rocker arm 14 by a pin 15. The rocker arm 14 is pivoted by a pin 16 to one end of a suspension rod 17. To the other end of the rod 17 is fixed a bracket 18, supporting two magnets 19 and 20, one on each end of the bracket 18. The rod 17, bracket 18, and magnets 19 and 20 form a pendulum-like system capable of swinging about the pivot 16. Mounted externally to the high pressure chamber 6 are two magnetic type mercury switches 21 and 22 of a conventional type, so disposed that when magnet 19 approaches within a certain distance from switch 21 it will close an electrical circuit through the switch. Similarly, when magnet 20 approaches switch 22 an electrical circuit will be closed through said switch. It is obvious that the wall of the chamber 6 in the region of the magnet and the switch must be of non-magnetic material. When the pendulum-like system is in its normal or middle position, the circuits through the switches 21 and 22 are broken.

In the low pressure chamber 7 of manometer 5 is contained a plunger 23 of suitable form. Fixed to one end of the plunger is a rod 24, passing externally through a stuffing box 25 in the enlarged upper portion of chamber 7. To the external end of rod 24 is fixed a toothed rack 26. A pinion spur 27, fixed to a shaft 28 of a reversible motor 29, is adapted to mesh with the rack 26. The motor 29 shown is of the alternating current shaded pole type having the shading coils 30 and 31 and a field winding 32. In operation, the field is normally continuously energized but rotation of the rotor occurs when either of the shading coils is short circuited, the direction of rotation depending upon which of the coils is so short circuited.

A two pole relay 33 and a similar relay 34 are provided, one pole of each of the relays 33 and 34 being double throw, the other pole of each relay being single throw, normally open. The operating coils 35 and 36 are provided on relays 33 and 34, respectively. A unidirectional motor 37 has a shaft 38, and an arm 39 and a lobed disc 40 are rigidly fixed to said shaft. The lobed disc 40 is shown detached from the shaft 38 for clarity in the drawing, but it is to be understood that arm 39 and lobed disc 40 rotate together with the shaft 38.

The arm 39 is adapted to engage a roller 41, of normally closed switch 42, only once per revolution of shaft 38, to momentarily open the circuit through this switch while the lobed disc 40 is adapted to engage a roller 43, of normally open switch 44, intermittently, thus intermittently closing and opening the circuit through switch 44. The function of parts 38 to 44, inclusive, will be hereinafter described and another method of performing the same function is shown in Figure 2 wherein a timing device 45, well known to the art, has a normally closed switch 46. In operation the switch 46 opens a predetermined time after power is applied to the line power terminals of the timing device.

In Figure 1 an arm 47 is fixed to the upper end of rack 26, and has attached thereto a lug 49 of electrical insulating material, and to lug 49 is fixed a plate 50. To the plate 50 are attached adjustable contactors 51 and 52, the former adapted to open a normally closed limit switch 53 when the rack reaches approximately its uppermost position. The member 52 opens the limit switch 54 when the rack reaches its approximate lowermost position. Also fixed to the insulating lug 49 is a contactor 55, adapted to contact the wire on a stationary resistor 56, the contactor 55 moving along the resistor 56 with the movement of rack 26. The contactor 55 and resistor 56 form part of a potentiometer system used in one form of application of this invention.

In operation when there is no flow of fluid through the conduit 1, the mercury in both chambers of manometer 5 will be at the same or zero level as indicated by line A—A, Figure 1. The lower portion of plunger 23, in chamber 7, will just touch the mercury surface in chamber 7, and the magnets 19 and 20 will be in their neutral position and at a distance from the mercury switches 21 and 22 too great to operate said switches. When a flow of fluid is established in conduit 1, a pressure differential will be produced between the inlet section 3 and throat section 4 of Venturi tube 2, the higher pressure being transmitted to chamber 6, and the lower pressure being transmitted to chamber 7 of manometer 5. This will cause the mercury level in chamber 6 to fall while that in chamber 7 will rise. The float 12 will fall with the mercury level in chamber 6. A very slight downward movement of the float will cause magnet 19 to move to the right sufficiently close to mercury switch 21 to close its circuit. As will be explained hereinafter this will start the motor 29 in a direction which will cause a downward movement of the plunger 23. The plunger will then displace the mercury and the levels in chamber 6 and 7 will rise. When the mercury level in chamber 6 and float 12 reach their zero positions the magnet 19 will again be at its original position and the circuit through mercury switch 21 will be broken to stop rotation of the motor 29 and movement of plunger 23. At this time the mercury level in chamber 7 will be at such a distance above that of the zero level in chamber 6 as will correspond to the pressure differential due to the flow through the Venturi tube 2, and the contactor 55 will be at a certain distance from its original or zero position on the resistor 56.

Should there be an increase in the flow rate, then again there will be a downward movement of the mercury level and float 12 in chamber 6 thus closing switch 21, rotating the motor 29, downward movement of the plunger 23, further displacement of mercury until once again the level in chamber 6 reaches its zero level, to open switch 21 to stop motor 29 and movement of the plunger 23. The mercury level in chamber 7 will now be at a greater distance above the zero level in chamber 6 to correspond to the greater differential head caused by the increased flow through the Venturi tube 2, and the contactor 55 will be at a still greater distance from its original or zero position on the resistor 56.

If now there should be a decrease in the flow rate the mercury level in chamber 6 will rise as will the float 12. Magnet 20 will then approach sufficiently close to mercury switch 22 to close its circuit. This will effect a rotation of the motor 29 in the opposite direction to raise the plunger 23, thus lowering the mercury levels in chambers 6 and 7. When the level in chamber 6 and therefore the float 12 reach their original or zero position the motor and plunger will stop and the contactor 55 will assume a position on the resistor 56 closer to its original or zero position.

It is desirable to have the contactor 55 reach the position corresponding to the flow rate in a short time. If, however, the rate of travel of the plunger 23 is too great, overtravel, above and below the equilibrium position may occur and cause what is generally known as hunting. To eliminate this hunting effect and at the same time employ a desirable plunger speed, means are provided whereby the major portion of the required plunger movement is made at a desirable speed and the final movement, as the position of equilibrium is neared, is made either intermittently, or continuously at a greatly reduced speed. Both means will be described.

The field winding 32 of motor 29 is energized as the following shows: from terminal 58 of power supply 57, conductor 60, pole 61 and contact 80 (when closed) of relay 33, conductor 63, through field coil 32 of motor 29, conductor 93 to terminal 59 of power supply 57. An alternate circuit for energizing the field coil 32 of motor 29 is as follows: from terminal 58 of power supply 57, conductors 60 and 76, pole 71 and contact 75 (when closed) of relay 34, conductors 81 and 63, coil 32 of motor 29, conductor 93 to terminal 59 of power supply 57. A third circuit for energizing coil 32 of motor 29 is as follows: from terminal 58 of power supply 57, conductors 60, 76 and 92, switch 44 (when closed) conductors 83, 81, 63, coil 32 of motor 29, conductor 93 to terminal 59 of power supply 57.

It is thus seen that coil 32 of motor 29 will be energized when either pole 61 and contact 80 of relay 33 are in the closed position or if pole 71 and contact 75 of relay 34 are in the closed position, or both; also if switch 44 is intermittently opened and closed due to the action of the lobed disc 40 on the roller 43 of switch 44 when lobed disc 40 is rotating, the coil 32 of motor 29 will be intermittently energized, causing intermittent rotation of the motor if either of the shading coils of motor 29 is short circuited.

In Figure 1, at an increase of flow rate, the mercury switch 21 will close. This will complete the following circuit: from terminal 58 of power supply 57, conductors 60 and 84, shading coil 31 of motor 29, conductor 64, limit switch 54, conductor 65, mercury switch 21, conductor 66, coil 36 of relay 34, conductors 68 and 69, switch 42, conductor 70, to terminal 59 of power supply 57. This will energize coil 36 of relay 34 and pole 71 will contact 73 and leave 75, while pole 72 will contact 74. A holding circuit to keep the coil 36 energized irrespective of the open or closed condition of mercury switch 21 will now be established as follows: from terminal 58 of power supply 57, and conductors 60 and 76, pole 71, and contact 73 of relay 34, conductor 85, coil 36, conductors 68 and 69, closed switch 42, conductor 70 to terminal 59 of power supply 57. This holding circuit will remain closed until the circuit is momentarily opened and reclosed at switch 42 and will not reclose unless or until the mercury switch 21 is closed. Assuming the switch 21 remains closed, shading coil 31 of motor 29 will be short circuited as follows: from terminal 79 (common to shading coils 30 and 31), coil 31, conductor 64, limit switch 54, conductor 65, switch 21, conductor 66, contact 73 and pole 71 of relay 34, conductors 76 and 84 and back to terminal 79. Motor 29 will now rotate to move the plunger 23 downwardly to displace mercury in the manometer to eventually open mercury switch 21 and stop motion of the motor 29 and plunger 23. If, because of inertia effects the plunger 23 travels beyond the position of equilibrium corresponding to the then flow rate through Venturi tube 2, the mercury level and float 12 in chamber 6 will rise above the zero level and cause closure of mercury switch 22. Motor 29 will therefore rotate in the opposite direction to raise plunger 23, to bring the level of mercury and float 12 in chamber 6 back towards their zero level. This is effected as follows: from terminal 58 of power supply 57, conductors 60 and 84, shading coil 30, conductor 86, limit switch 53, conductor 98, mercury switch 22, conductor 99, coil 35 of relay 33, conductors 87 and 69, switch 42, conductor 70 to terminal 59 of power supply 57. This will energize coil 35 of relay 33, pole 61 will contact 88 and leave 80 while pole 89 will contact 90. A holding circuit to keep coil 35 energized irrespective of the open or closed condition of mercury switch 22 will now be established, as follows: from terminal 58 of power supply 57, conductor 60, pole 61 and contact 88 of relay 33, conductor 91, coil 35, conductors 87 and 69, closed switch 42, conductor 70 to terminal 59 of power supply 57. This holding circuit will remain closed until the circuit is momentarily opened and reclosed at switch 42 and will not reclose unless or until mercury switch 22 is closed.

The coils 35 and 36 of relays 33 and 34 are now both energized. The circuit to the field coil 32 of motor 29 is now broken since pole 61 of relay 33 does not contact 80 and the pole 71 of relay 34 does not contact 75 and the motor therefore cannot rotate. A complete circuit however will be established through field coil 32 of motor 29 through switch 44 when that switch is closed, as follows: from terminal 58 of power supply 57, conductors 60, 76, 82 and 92, switch 44 when closed, conductors 83 and 81, conductor 63, through field coil 32 of motor 29, conductor 93, to terminal 59 of power supply 57.

While the coils 35 and 36 of relays 33 and 34 respectively are both energized, a circuit is established through motor 37 as follows: from terminal 58 of power supply 57, conductors 60, 76, 82 and 94, motor 37, conductor 95, contact 74 and pole 72 of relay 34, conductor 96, pole 89 and contact 90 of relay 33, conductor 97 to terminal 59 of power supply 57. As motor 37 now rotates in the direction of the arrow, lobed disc 40 attached to shaft 38 of motor 37 will rotate and as each lobe of the disc 40 passes over the roller 43 of switch 44 it will intermittently close and open the circuit of switch 44 and impart an intermittent motion to the motor 29. The plunger 23 and float 12 systems will approach their equilibrium position in short steps and eventually reach it and cease moving. When the arm 39 of motor 37 makes approximately one revolution, the arm 39 will engage the roller 41 of switch 42 and open the circuit thereof. This will break the circuit of the coils in relays 33 and 34 which in turn will remove the power supply from motor 37 since pole 89 of relay 33 leaves 90, and pole 72 of relay 34 leaves 74. However, because of the inertia of the rotor of the motor, the arm will pass from out of engagement with roller 41 of switch 42 and permit switch 42 to assume its normally closed condition.

When coils 34 and 36 of relays 33 and 34 respectively are deenergized, pole 61 of relay 33 will also leave its contact 88 and touch 80, and pole 71 of relay 34 will leave its contact 73 and touch 75.

If a decrease in flow should now occur, magnet 20 will move towards and cause closure of mercury switch 22 and complete the following circuit: from terminal 58 of power supply 57, conductors 60 and 84, shading coil 30 of motor 29, conductor 86, limit switch 53, conductor 98, mercury switch 22, conductor 99, coil 35 of relay 33, conductors 87 and 69, closed switch 42, conductor 70 to terminal 59 of power supply 57. This will energize coil 35 of relay 33 and as described hereinbefore will cause an upward movement of the plunger. Any movement of the plunger 23 and the float 12 beyond their equilibrium position will cause mercury switch 21 to energize coil 36 of relay 34 and as before will cause a reversal of the plunger movement and at the same time start motor 37 and lobed cam 40, to produce an intermittent movement of the plunger 23 towards its equilibrium position. In Figure 2 is shown another means by which hunting of the plunger 23 may be eliminated. In this means a timer 45 having a normally closed switch 46 is employed in place of the motor 37, arm 39, switch 42, lobed disc 40, and switch 44. Also a resistance 100 of suitable value is placed in the circuit of field coil 32 of motor 29. When coils 35 and 36 of relays 33 and 34 respectively are deenergized the resistance is short circuited by way of conductor 101, contact 75 and pole 71 of relay 34, conductor 103 and conductors 60 and 102. Another path for short circuiting the resistance 100 is by way of conductors 101 and 104, contact 80 and pole 61 of relay 33 and conductors 76, 60 and 102. It is thus seen that if either or both of the relay coils 35 and 36 are de-energized the resistance 100 will be short circuited and the motor 29 when its circuit is complete will operate at full speed. When the relay coils are both energized the short circuit for the resistance 100 will be broken and the motor when its circuit is completed will operate at a reduced speed. This condition will arise when the plunger makes its first reversal of movement due to overtravel as outlined in connection with the intermittent device shown in Figure 1. The slow movement of the plunger 23 about the equilibrium position is of gradually decreasing amplitude which reaches zero in a short time.

When both relay coils are energized a complete circuit for the timer 45 is established as follows: from terminal 58 of power supply 57, conductors 102 and 105, timer 45, conductor 106, contact 90 and pole 89 of relay 33, conductor 96, pole 72 and contact 74 of relay 34, conductors 107, 108 and 109, normally closed switch 46 of timer 45, conductor 110 to terminal 59 of power supply 57. The timer then will operate for a pre-set time upon the expiration of which the switch 46 will open. This will break the circuit through the timer 45 and the relay coils 35 and 36, whereupon the timer will stop and the switch 46 will close. But the circuit through the timer motor is now broken between contact 90 and pole 89 of relay 33 and also between contact 74 and pole 72 of relay 34, therefore closure of switch 46 does not again start timer 45. Power is available to operate relay coils 35 and 36 when mercury switches 21 or 22 again close.

In Figure 3 is shown means whereby the movement of the contactor 55 of Figure 1 may be reproduced at a remote station and thereby move a member at such remote station in direct proportion to a flow rate through Venturi tube 2 of Figure 1. Such member may then be attached to a chemical feeding device of a type in which the rate of chemical fed varies in direct proportion to the movement of such member.

The resistor 56 of Figure 1 is shown diagrammatically in Figure 3 as 56 and the contactor 55 of Figure 1 is shown as 55. A resistor 125 is remotely connected to the terminals of resistor 56 by conductors 120 and 121. A reversible shaded pole type of motor is at 131. Fixed to the shaft of motor 131 is an arm 123, to the free end of which is attached a contactor 122, insulated electrically from the shaft of the motor. Also fixed to the motor shaft is an arm 124, to the free end of which is attached a link 126. The free end of link 126 is connected to the feeder to be controlled.

A source of voltage 111, preferably low, is connected to the conductors 120 and 121. The coil 130 of a sensitive double throw switch 112, of the galvanometer type, is connected in the circuit between contactors 55 and 123. A source of power is at 127 to continuously excite the field coil 119 of motor 131.

The potential of contact 55 will depend upon its distance from its zero position. The potential of contact 122 will also depend upon its distance from its zero position. When these potentials are substantially equal the coil 130 of switch 112 will not deflect and the pole 113 of switch 112 will not contact either 128 or 129 of the switch. If the potential of contact 55 becomes greater than that of contact 122, due to a movement of the plunger 23, a current will flow through the coil 130 of switch 112 and cause pole 113 to contact 128 thereby short circuiting shading coil 117 of motor 131 and causing the motor to move say clockwise. This will move contactor 122 to the right until its potential substantially equals that of contact 55 and the motor 131 will stop. While contactor 122 is moving so will arm 124 and link 126 to operate the chemical feeder to increase the rate to a value corresponding to the position of contact 55, hence to the position of the plunger 23, and consequently to the flow rate. For a movement of the plunger 23 in the opposite direction, the potential at contact 55 will decrease, causing a flow of current through coil 130 of switch 112 in the opposite direction, the pole 113 will contact 129 short circuiting shading coil 118 of motor 131. The motor will then rotate in the opposite direction to bring the contact 122 to a position to have its potential substantially equal to the new value of the potential of 55, whence the motor will stop and the arm 124 and link 126 will operate the chemical feeder so that it will feed chemical to correspond to the new position of contact 55. This operation of a Wheatstone bridge to control rate of feed of the chemical feeder or the like, will be readily understood by those familiar in the art.

If, as an example, with the float 12 in the high pressure chamber 6, the maximum differential pressure imposed upon the manometer 5 is 9 inches of mercury under water and the maximum movement of plunger 23 is 4 inches and it is desired that the movement of plunger 23 shall vary directly as the first power of the rate of fluid flow through the Venturi tube 2, then the equation of the generating curve of the plunger 23 is $$r = .792 \sqrt{1 - \frac{1}{\sqrt{2.25y + 1}}} \text{ in inches}$$

wherein $r$ equals the radius of the plunger in inches taken at a distance $y$ in inches from the apex and wherein the uniform internal radius of low pressure chamber 7 is .792 inch.

With the float 12 in the high pressure chamber 6, a maximum differential pressure of H inches of mercury under water, a maximum movement of the plunger 23 of P inches, a low pressure chamber of uniform radius R inches, then for a plunger movement which varies directly as the flow rate, the equation of the generating curve for the plunger is $$r = R \sqrt{1 - \frac{1}{\sqrt{\frac{4Hy}{P^2} + 1}}}$$

where $r$ is the radius of the plunger at a distance $y$ from the apex of said curve.

It will be obvious to those versed in the art that to cause movement of the plunger 23 to vary directly as the height of a liquid in a tank, i. e. pressure, the plunger will be cylindrical in form.

Another form which this invention may take is shown in Figure 4, wherein a manometer 5a, comprising a high pressure chamber 6a and a low pressure chamber 7a, are connected by a passage 8. Within the manometer 5a is a manometric fluid 9, such as mercury.

The inlet section of the Venturi tube (not shown in Figure 4) connects to the high pressure chamber 6a by means of pipe 10 while the throat section of the Venturi tube connects to the low pressure chamber 7a by pipe 11.

Within the low pressure chamber 7a, a float 12 rests on the surface of the mercury.

Any increase in the differential pressure created by the Venturi tube will cause a fall of the mercury level in chamber 6a and a rise of mercury level in chamber 7a.

As explained in connection with Figure 1 a rise of level in the float chamber 7a will cause magnet 20 to move toward the left and cause closure of switch 21a which now functions the same as switch 21 shown in Figure 1 to produce an upward movement of the plunger 23a, thereby lowering the mercury levels in chambers 6a and 7a until the level in float chamber 7a reaches the equilibrium level A—A, whereupon motion of plunger 23a ceases. In a similar manner a lowering of the differential pressure will cause a rise of mercury level in chamber 6a, and a fall of mercury level in chamber 7a. Magnet 19 will now approach and close switch 22a to lower the plunger 23a, to raise the level of mercury in chamber 6a until this level reaches the equilibrium level A—A to stop motion of the plunger 23a.

Having thus described our invention, we claim as new and desire to secure by Letters Patent:

1. In a pressure responsive device which comprises a manometer connected to an external source of pressure, said manometer having a high pressure chamber and a low pressure chamber, an opening affording communication between said chambers and a manometric fluid in said chambers and said communication, the levels of said fluid being responsive to changes in pressure, a plunger member within one of said chambers, power operated means operatively connected to said plunger member to position same in said chamber, switches operatively joined to said power operated means to control the flow of power thereto, said switches being spaced away from the manometric fluid, a float riding on the manometric fluid in one of said chambers, a movable switch operating member so connected to said float as to be positioned by the movement thereof, an interrupter adapted to periodically shut off the flow of power to said power operated means, and means associated with said plunger member for translating its movement to a controlled apparatus, said last mentioned means comprising a Wheatstone bridge circuit, means associated with said plunger member for varying the resistance ratio of two arms of said Wheatstone bridge circuit, and means associated with the controlled apparatus for varying the resistance ratio of the remaining two arms of said Wheatstone bridge circuit to approach and correspond to said first ratio whereby said controlled apparatus approaches and reaches a condition corresponding to the position of said plunger member.

2. In an actuator of the manometric type having a high pressure chamber, a low pressure chamber, an opening affording communication between said chambers below the normal minimum level of manometric fluid therein and manometric fluid in said chambers, means for securing a motion in predetermined relation to change of pressure in said chambers, said means comprising a plunger in one of said chambers, a reversible motor operatively joined to said plunger to move same, a pair of electric switches, circuits joining said switches and said motor in such manner that closing one switch will tend to cause said motor to operate in one direction and closing the other switch will tend to cause said motor to operate in the opposite direction, a float in one of said chambers, a switch closing member positioned intermediate said switches and mounted as to be movable toward either switch, and being so joined to said float as to be moved toward one switch upon rise of the float and toward the other switch upon fall of said float.

3. In an actuator of the manometric type having a high pressure chamber, a low pressure chamber, an opening affording communication between said chambers below the normal minimum level of manometric fluid therein, and manometric fluid in said chambers, a positionable member and means for positioning said member in accordance with the difference in pressure in said chambers, said means comprising a reversible motor joined to said positionable member, a power circuit joined to said motor, said circuit including power switching means spaced away from the manometric fluid to selectively control the flow of power to said motor, and means to operate said switching means in one direction upon rise of manometric fluid in one of said chambers and in the other direction upon the fall of said fluid, said last named means including a float riding upon the manometric fluid in said chamber, and a switch operating member joined to said float and extending towards said switching means.

4. An actuator comprising a high pressure chamber, a low pressure chamber, manometric fluid in said chambers, an opening between said chambers below the normal manometric fluid level therein, a plunger in one of said chambers and means to position said plunger in conformity with a difference in pressure in said chambers, said means comprising a reversible electric motor operatively joined to said plunger, a pair of magnetically operated electric switches, circuits joining said switches to said motor in a manner such that closing one switch will tend to cause said motor to operate in one direction and closing the other switch will tend to cause the motor to operate in another direction, a magnetic member intermediate said switches and mounted to be moved toward either switch, a float riding on the manometric fluid in one of said chambers, said float being so joined to said magnetic member as to move it toward one of said switches on rise of the manometric fluid above a datum level in the chamber containing the float and toward the other switch on fall of the manometric fluid below said level.

5. The apparatus of claim 4 wherein the structure joining the float and the magnetic member is so constructed and arranged that the motion of the member will be greater than that of the float.

6. The apparatus of claim 2 wherein the switches are exterior to the manometric chambers, the magnetic member within one of said chambers and the wall of said chamber between said member and said switches is of non-magnetic material.

7. The apparatus of claim 4 comprising in addition a timer in the circuit leading to said switches to periodically interrupt the flow of power through said circuits.

8. In an actuator of the type described in claim 3, means for preventing continued oscillation of the positionable member about its position of equilibrium, the functioning of said means being initiated upon first reversal of movement of said positionable member, and means for causing cessation of functioning of said oscillation preventing means a predetermined time after its initiation.

9. An actuator of the type described in claim 3 characterized by a positionable member of varying cross-sectional area whereby the said positionable member is positioned in a predetermined relation to a flow rate.

10. An actuator of the type described in claim 3 characterized by a manometer having one leg thereof of varying cross-sectional area in combination with a positionable member of uniform cross-sectional area, whereby said positionable member is positioned in a predetermined relation to a flow rate.

11. The device as described in claim 2 in which the maximum pressure differential existing between said chambers is H inches of mercury under water, in which the float is supported by the column of manometric fluid in the high pressure chamber and in which the plunger moves a maximum of P inches in the low pressure chamber having a uniform internal radius R inches, said plunger being of varying cross-sectional area, the equation of the generating curve of said plunger being $$r = R\sqrt{1 - \frac{1}{\sqrt{\frac{4Hy}{P^2}+1}}}$$

where $y$ in inches is the distance from the apex of said curve to the point where $r$ is taken, so that the movement of said plunger from a datum will vary as the square root of H, and therefore directly as the flow rate through the source of differential pressure.

WALTER H. GREEN.
SAMUEL L. ADELSON.